July 9, 1968    L. J. MONTONE    3,392,288
METHOD OF AND CIRCUIT FOR CLIPPING PULSES
Filed April 8, 1964
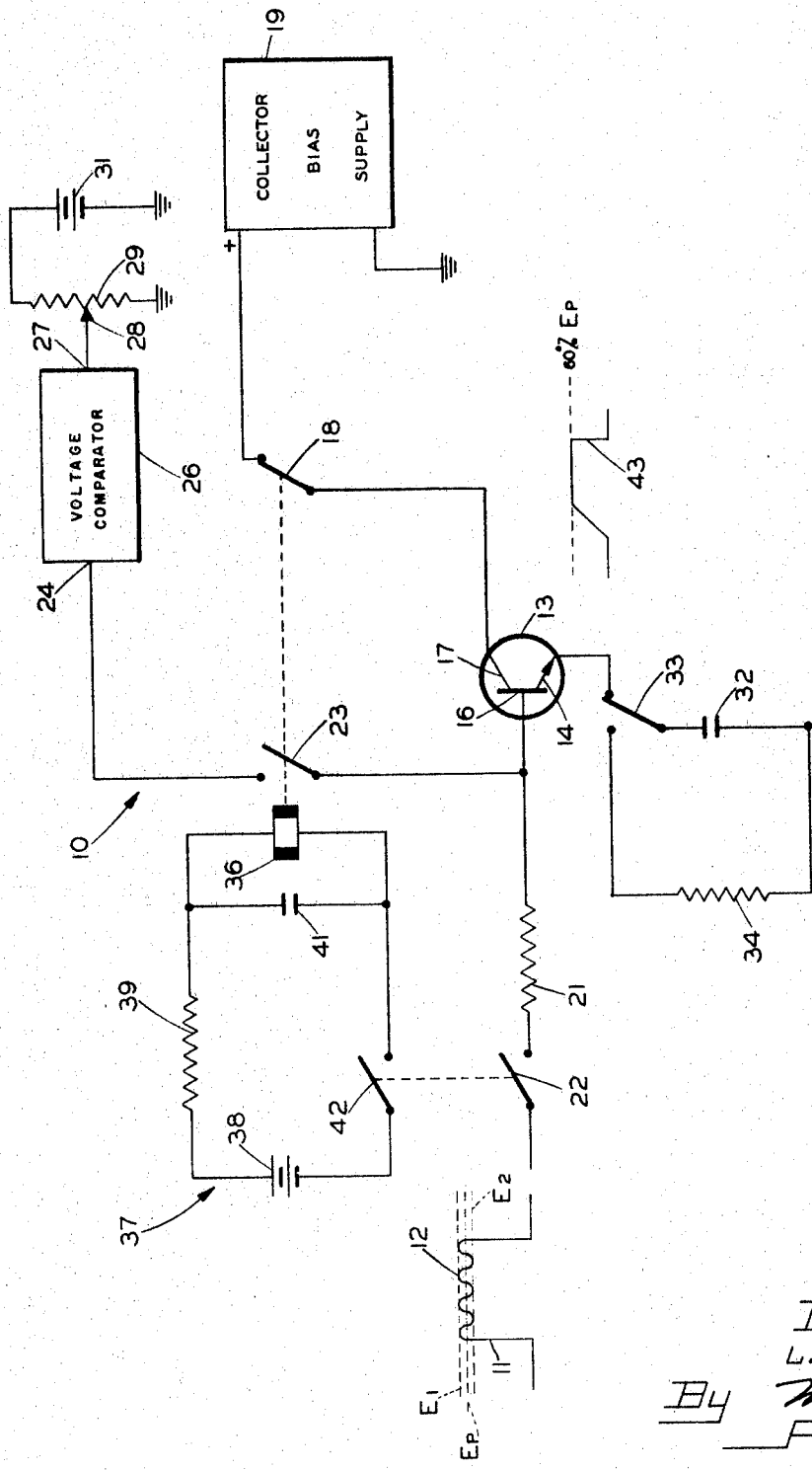
INVENTOR
L.J. MONTONE
By M. Pfeffer
ATTORNEY 3,392,288
METHOD OF AND CIRCUIT FOR CLIPPING PULSES
Liber J. Montone, Reading, Pa., assignor to Western Electric Company, Incorporated, New York, N.Y., a corporation of New York
Filed Apr. 8, 1964, Ser. No. 358,322
11 Claims. (Cl. 307—237)

ABSTRACT OF THE DISCLOSURE

A method of and circuit for clipping pulses to enable accurate measurement of their amplitude include a transistor with a voltage source connected to one electrode and a capacitor connected to another electrode. A pulse to be clipped is applied through a resistor to a third electrode of the transistor to partially charge the capacitor. After a predetermined time of pulse application, the voltage source is disconnected to clamp the third electrode to the voltage of the capacitor at the time of disconnection, thereby clipping the pulse at a predetermined percentage of its amplitude.

---

This invention relates to a method of and circuit for clipping pulses and, more particularly, to a method of and circuit for clipping a pulse to enable accurate measurement of the pulse amplitude.

The need for pulse amplitude measurement is, of course, quite well known. Equally well known is the need for techniques and equipment which will perform this task quickly and with a high degree of accuracy. One of the factors militating against fast accurate pulse amplitude measurement is that of noise superimposed on the pulse wave form. Thus, for example, if a measurement of pulse amplitude is made for a time period less than the duration of the pulse when the superimposed noise is at a maximum (e.g., during a positive half of a noise cycle) the results of the measurement would indicate that the pulse is of greater amplitude than it actually is. Conversely, if the measurement of pulse amplitude is made during a short interval when the superimposed noise is at a minimum (e.g., during a negative half cycle of noise) the results of the measurement would indicate that the pulse is of a lesser amplitude than it actually is. The present invention obviates the foregoing problem by providing a method of and circuit for clipping a pulse in fixed proportion to the magnitude thereof and at a level below that of the expected superimposed noise, thereby removing the superimposed noise from the pulse and enabling accurate measurement of the pulse amplitude.

It is, therefore, an object of this invention to provide a new and improved method of and circuit for clipping pulses.

It is another object of this invention to provide a new and improved method of and circuit for clipping a pulse to enable accurate measurement of the pulse amplitude.

It is still another object of this invention to provide a new and improved method of and circuit for clipping pulses with a transistor.

It is a further object of this invention to provide a new and improved method of and circuit for accurately measuring the amplitude of a pulse having superimposed noise thereon.

A method, illustrating certain features of the invention, for clipping a pulse with a transistor having a voltage source connected to a first electrode thereof and a capacitor connected to a second electrode thereof, may include applying the pulse through a resistor to a third electrode of the transistor to partially charge the capacitor. After a predetermined time of pulse application, the voltage source is disconnected from the first electrode to clamp the third electrode to the voltage of the capacitor at the time of disconnection and to thereby clip the pulse at a predetermined percentage of its amplitude.

A pulse clipping circuit, illustrating certain features of the invention, may include a transistor having a voltage source connected to a first electrode thereof, and a capacitor connected to a second electrode thereof. Means including a resistor are provided for applying a pulse to be clipped to a third electrode of the transistor to partially charge the capacitor. Means operable after a predetermined time of pulse application are provided for disconnecting the voltage source from the first electrode to clamp the third electrode to the voltage of the capacitor at the time of disconnection, and thereby clip the pulse at a predetermined percentage of its amplitude.

The invention will be more fully understood from the detailed description which follows when read in conjunction with the single appended drawing which illustrates schematically an embodiment of the invention.

Referring to the drawing, there is illustrated a circuit 10 for measuring the amplitude $E_p$ of a pulse 11 having superimposed noise 12 thereon which varies, for example between voltage levels $E_1$ and $E_2$. More specifically, the circuit 10 is employed for comparing the amplitude $E_p$ of the pulse 11 to a predetermined value thereof.

The circuit 10 includes a transistor 13 having emitter, base and collector electrodes 14, 16 and 17, respectively. The collector electrode 17 is connected through a normally closed contact 18 to a suitable source 19 of D.C. bias potential. The base electrode 16 is connected through a resistor 21 to one side of a normally open contact 22, the pulse 11 being applied to the other side of the contact 22. Additionally, the base 16 is connected through a normally open contact 23 to one input 24 of a conventional voltage comparator 26, such as a Dymec Model 2401A Digital Voltmeter. The other input 27 of the comparator 26 is connected to an arm 28 of a potentiometer 29 having a suitable source 31 of D.C. voltage connected thereacross. The emitter circuit includes a capacitor 32 selectively connectable by means of a contact 33 to the emitter 14, or in parallel with a resistor 34.

The contacts 18 and 23 are ganged for simultaneous operation and are operated by a relay 36 which is connected in a timing circuit 37. The timing circuit 37 includes the relay 36, a source of D.C. voltage 38, a resistor 39, a capacitor 41 and a contact 42, and is functional upon closure of the contact 42 to energize the relay 36 after a time delay determined by the resistor 39 and the capacitor 41. As seen, the contact 42 is ganged for simultaneous operation with the contact 22.

Operation

Upon closure of the contact 22 in synchronism with the leading edge of the pulse 11, by suitable means not shown, the pulse 11 is applied through the resistor 21 to the base electrode 16 of the transistor 13 to partially charge the capacitor 32 rapidly, the charging current of the capacitor being multiplied by the base to emitter current gain $h_{FE}$ of the transistor. Simultaneously with the closing of contact 22, the contact 42 closes to initiate the energization of the relay 36. After a predetermined time, i.e., the time delay of the timing circuit 37, the relay 36 energizes to open the contact 18 and close the contact 23.

The parameters of the charging circuit, i.e., resistor 21, capacitor 32 and, of importance, the current gain $h_{FE}$ of the transistor 13, are selected such that during the predetermined time, the capacitor charges to a voltage which is less than $E_2$ and which is a predetermined percentage of the amplitude of the pulse 11; for example, the capacitor may charge to a voltage which is 60 percent of $E_p$, as shown by the capacitor voltage wave form 43.

Opening of the contact 18 disconnects the collector bias supply 19 from the collector electrode 17. This results in the base-emitter junction of the transistor 13 acting as a diode to clamp the base electrode 16 to the voltage of the partially charged capacitor 32 and thereby clip the crest of the pulse 11. Since transistor action is no longer present, the capacitor 32 continues to charge at a comparatively negligible rate.

Closure of the contact 23 applies the voltage of the base electrode 16 to the input 24 of the voltage comparator 26, which compares this voltage to the potential of the arm 28. The arm 28 is set prior to measurement such that the potential thereof is equal to 60 percent of a predetermined value of $E_p$. Accordingly, the voltage comparison performed by the voltage comparator 26 is, in fact, a comparison of the actual amplitude $E_p$ of the pulse 11 to the predetermined value thereof. Further, as should be appreciated, this comparison is independent of the magnitude or phase of the superimposed noise 12.

Upon completion of the comparison, the contact 33 is operated to connect the capacitor 32 in parallel with the resistor 34 thereby discharging the capacitor through the resistor. The contact 33 is then returned to its original position, placing the capacitor 32 in readiness for another pulse comparison cycle. Advantageously, the resistor 34 should be of a very small value, e.g., 27 ohms, to provide rapid discharging of the capacitor 32.

In order to further free the comparison from inaccuracy due to noise, the capacitor 32 should be very large, for example, 500 microfarads, to provide noise by-pass. Large size capacitors can, of course, be employed in the circuit 10 without detracting from the speed of measurement because of the multiplication of the capacitor charging current by $h_{FE}$ of the transistor 13 which, for a transistor such as a Western Electric 2N1173, may be in the order of 50. The resistor 21 is selected in accordance with the values of capacitor 32 and $h_{FE}$ of transistor 13 to provide the desired charging rate of the capacitor. Typically, with a capacitor 32 of 500 microfarads and a 2N1173 transistor, the resistor 21 may be 2,750 ohms to charge the capacitor to 60 percent of $E_p$ in approximately 200 milliseconds.

It is to be understood that the above-described embodiment is merely illustrative of the principles of the invention. Other embodiments may be devised by a person skilled in the art which embody these principles and fall within the spirit and scope thereof.

What is claimed is:

1. A method of clipping a pulse with a transistor having a voltage source connected to a first electrode thereof and a capacitor connected to a second electrode thereof, which method comprises the steps of:
    applying the pulse to a third electrode of the transistor to partially charge the capacitor; and
    disconnecting the voltage source from the first electrode after a predetermined time of pulse application to clamp the third electrode to the voltage of the capacitor at the time of disconnection and to thereby clip the pulse at a predetermined percentage of its amplitude.

2. A method of accurately measuring the amplitude of a pulse with a transistor having a voltage source connected to a first electrode thereof and a capacitor connected to a second electrode thereof, which method comprises the steps of:
    applying the pulse through a resistor to a third electrode of the transistor to partially charge the capacitor;
    disconnecting the voltage source from the first electrode after a predetermined time of pulse application to arrest the charging of the capacitor; and
    measuring the capacitor voltage at the time of disconnection to ascertain the amplitude of the pulse.

3. A method of accurately measuring the amplitude of a pulse, which comprises the steps of:
    connecting a voltage source to a first electrode of a transistor;
    connecting a capacitor to a second electrode of the transistor;
    applying the pulse through a resistor to a third electrode of the transistor to partially charge the capacitor;
    disconnecting the voltage source from the first electrode after a predetermined time of pulse application to clamp the third electrode to the voltage of the capacitor at the time of disconnection and to thereby clip the pulse at a predetermined percentage of its amplitude; and
    comparing the voltage of said third electrode after disconnection of the voltage source to a predetermined value thereof to thereby ascertain the relationship of the actual amplitude of the pulse to a predetermined value thereof.

4. A pulse clipping circuit, which comprises:
    a transistor having first, second and third electrodes;
    a source of voltage connected to the first electrode;
    a capacitor connected to the second electrode;
    means including a resistor for applying a pulse to be clipped to the third electrode to partially charge the capacitor; and
    means operable after a predetermined time of pulse application for disconnecting the voltage source from the first electrode to clamp the third electrode to the voltage of the capacitor at the time of disconnection and to thereby clip the pulse at a predetermined percentage of its amplitude.

5. A pulse clipping circuit according to claim 4 in which the first electrode is a transistor collector, the second electrode is a transistor emitter and the third electrode is a transistor base.

6. A pulse clipping circuit according to claim 4 further including means operable after the operation of the disconnecting means for discharging the capacitor to prepare the same for clipping another pulse.

7. A circuit for the accurate measurement of pulse amplitude, which comprises:
    a transistor having first, second and third electrodes;
    a source of voltage connected to the first electrode;
    a capacitor connected to the second electrode;
    means including a resistor for applying a pulse to be measured to the third electrode to partially charge the capacitor;
    means operable after a predetermined time of pulse application for disconnecting the voltage source from the first electrode to arrest the charging of the capacitor; and
    means responsive to the capacitor voltage at the time of disconnection of the voltage source for ascertaining the amplitude of the pulse.

8. A circuit for the accurate measurement of pulse amplitude, which comprises:
    a transistor having first, second and third electrodes;
    a source of voltage connected to the first electrode;
    a capacitor connected to the second electrode;
    means including a resistor for applying a pulse to be measured to the third electrode to partially charge the capacitor;
    means operable after a predetermined time of pulse application for disconnecting the voltage source from the first electrode to clamp the third electrode to the voltage of the capacitor at the time of disconnection and to thereby clip the pulse at a predetermined percentage of its amplitude; and
    means responsive to the clamped third electrode voltage for ascertaining the amplitude of the pulse.

9. A circuit for the accurate measurement of pulse amplitude, which comprises:
    a transistor having first, second and third electrodes;
    a source of voltage connected to the first electrode;
    a capacitor connected to the second electrode;
    means including a resistor for applying a pulse to be measured to the third electrode to partially charge the capacitor;

means operable after a predetermined time of pulse application for disconnecting the voltage source from the first electrode to clamp the third electrode to the voltage of the capacitor at the time of disconnection and to thereby clip the pulse at a predetermined percentage of its amplitude; and means operable after operation of said disconnecting means for comparing the voltage of said third electrode to a predetermined value of voltage for said third electrode to thereby ascertain the relationship of the actual amplitude of the pulse to a predetermined value of amplitude of the pulse.

10. A circuit for the accurate measurement of pulse amplitude, which comprises:

a transistor having first, second and third electrodes;
a source of voltage connected to the first electrode;
a capacitor connected to the second electrode;
means including a resistor for applying a pulse to be measured to the third electrode to partially charge the capacitor;
means operable after a predetermined time of pulse application for disconnecting the voltage source from the first electrode to clamp the third electrode to the voltage of the capacitor at the time of disconnection and to thereby clip the pulse at a predetermined percentage of its amplitude;
a voltage comparator having first and second inputs;
a source of reference voltage connected to the first input of said voltage comparator, the value of said reference voltage having the same relationship to a predetermined value of the amplitude of the pulse being measured as that of the clamped third electrode voltage to the amplitude of said pulse; and
means selectively operable for connecting the third electrode to the second input of said voltage comparator to thereby ascertain the relationship of the actual amplitude of the pulse to the predetermined value of amplitude of the pulse.

11. A circuit in accordance with claim 10 in which said connecting means and said disconnecting means are operable simultaneously.

No references cited.

ARTHUR GAUSS, *Primary Examiner.*

J. ZAZWORSKY, *Assistant Examiner.*